United States Patent
Minden (10) Patent No.: US 7,792,164 B2
(45) Date of Patent: Sep. 7, 2010

(54) OPTICAL PULSE GENERATOR FOR HIGH POWER FIBER AMPLIFIERS

(75) Inventor: Monica L. Minden, Calabasas, CA (US)

(73) Assignee: The Boeing Company, Chicago, IL (US)

(*) Notice: Subject to any disclaimer, the term of this patent is extended or adjusted under 35 U.S.C. 154(b) by 38 days.

(21) Appl. No.: 12/329,317

(22) Filed: Dec. 5, 2008

(65) Prior Publication Data
US 2010/0142573 A1 Jun. 10, 2010

(51) Int. Cl.
*H01S 3/13* (2006.01)

(52) U.S. Cl. .................. 372/29.023; 372/29.016; 372/25; 372/26; 372/30

(58) Field of Classification Search ........... 372/29.016, 372/29.023, 25, 26
See application file for complete search history.

(56) References Cited

U.S. PATENT DOCUMENTS 4,841,529 A * 6/1989 Javan ...................... 372/32
5,541,947 A * 7/1996 Mourou et al. ............ 372/25
2006/0153254 A1* 7/2006 Franjic et al. ............. 372/30

OTHER PUBLICATIONS

Van Howe et al., Compensation of Self-Phase Modulation in Fiber-Based Chirped-Pulse Amplification Systems, Optics Letters, Jun. 1, 2006, vol. 31, No. 11, Optical Society of America, (3 pgs).

* cited by examiner

*Primary Examiner*—Dung T Nguyen
(74) *Attorney, Agent, or Firm*—Toler Law Group (57) ABSTRACT

Systems and methods for pre-correcting accumulated optical nonlinear phase error in a shaped optical pulse derived from a continuous wave laser signal are provided. A continuous wave laser signal is received. A pulse signal is received. A shaped optical pulse is generated from the continuous wave laser signal upon being driven by the pulse signal. A pulse intensity level to be applied to the phase of the shaped optical pulse is received. A phase correcting signal is generated based on the pulse intensity level. Application of the phase correcting signal to the shaped optical pulse is time-synchronized and the phase correcting signal is applied to the shaped optical pulse to generate a pre-corrected shaped optical pulse.

20 Claims, 7 Drawing Sheets

OPTICAL PULSE GENERATOR FOR HIGH POWER FIBER AMPLIFIERS

FIELD OF THE DISCLOSURE

The present disclosure is generally related to creating optical pulses that are pre-corrected for use in high power fiber amplifiers. The signal includes one or more shaped pulses formed from a continuous wave laser signal and may be used in a coherently combined fiber amplifier array.

BACKGROUND

Coherent combination of outputs from fiber amplifiers may be accomplished by correcting linear phase errors via electronic or nonlinear optical feedback when the input signal is a common continuous wave laser signal with a bandwidth up to several hundred megahertz (MHz). Coherent combination of laser pulse trains from fiber amplifiers is also straightforward when the separate laser pulses have a low peak intensity. However, for shaped laser pulses at high peak power, accumulation of nonlinear phase errors becomes difficult to correct. Nonlinear phase errors become important at intensities greater than $I_{pk}n_2L \sim \lambda/2$, where $I_{pk}$ is the peak intensity, $n_2$ is the Kerr coefficient ($\sim 3 \times 10^{-20}$ m$^2$/W), $\lambda$ is the wavelength, and L is the fiber amplifier length. Such a condition will exist, for example, for an average optical power of only 3.5 W in a 10 m long fiber amplifier with a train of ins duration, 1 µm wavelength optical pulses at a repetition rate of 100 MHz. For coherent combining of outputs, linear phase differences between amplifiers may be corrected using electronic or nonlinear optical feedback loops. However, electronic or nonlinear optical feedback loops may be ineffective in compensating for the nonlinear phrase errors in high-power, short-duration shaped laser pulses. Failing to compensate for nonlinear phase errors may result in poor signal coherence, poor beam quality, and unstable signal power levels in a coherently combined output.

SUMMARY

Systems and methods for creating a pulse or a set of pulses with pre-corrected nonlinear phase error for high power fiber amplifiers from a continuous wave laser signal are provided. According to an embodiment, a laser input is configured to receive a continuous wave laser signal. A pulse signal input is configured to receive a pulse signal. An amplitude modulator is configured to receive the continuous wave laser signal and the pulse signal and to generate a shaped optical pulse when driven by the pulse signal. A correcting phase modulator is configured to receive the shaped pulse, a delayed pulse signal, and a pulse intensity level, and to generate a pre-corrected shaped pulse. The nonlinear phase modulator generates a phase correcting signal proportional to the pulse intensity level and applies the phase correcting signal to the shaped optical pulse when driven by the delayed pulse signal to generate the pre-corrected shaped pulse. A delay device is configured to receive the pulse signal at a same time that the amplitude modulator receives the pulse signal and to generate the delayed pulse signal.

According to another embodiment, a continuous wave laser is configured to generate a continuous wave laser signal. A pulse generator is configured to generate a pulse signal including a plurality of pulses, each of the pulses having a period of approximately one nanosecond. An amplitude modulation system is configured to receive the continuous wave laser signal and the pulse signal. The amplitude modulation system is configured to receive the continuous wave laser signal and the pulse signal and to generate a plurality of shaped optical pulses. A plurality of correcting phase modulation systems is provided. Each of the plurality of correcting phase modulation systems includes a correcting phase modulator configured to receive one of the plurality of shaped optical pulses, a delayed pulse signal, and a pulse intensity level, and to generate a phase correcting signal that is responsive to the pulse intensity level. The correcting phase modulator of each of the plurality of phase modulation systems applies the phase correcting signal to one of the plurality of shaped optical pulses when driven by the delayed pulse signal.

According to yet another embodiment, a continuous wave laser signal is received. A pulse signal is received. A shaped optical pulse is generated from the continuous wave laser signal upon being driven by the pulse signal. A pulse intensity level indicates a phase subsequently resulting from amplification of the shaped optical pulse is received. A nonlinear phase correcting signal is generated based on the pulse intensity level. Application of the nonlinear phase correcting signal to the shaped pulse is time-synchronized and the nonlinear phase correcting signal is applied to the shaped pulse to generate a phase-corrected shaped pulse.

The features, functions, and advantages that have been or will be discussed can be achieved independently in various embodiments or may be combined in yet other embodiments further details of which can be seen with reference to the following description and drawings.

DETAILED DESCRIPTION

Amplifying a shaped pulse, particularly a high power, short-duration laser pulse, may result in nonlinear phase error that may not be correctable using electronic or optical feedback paths. Nonlinear phase errors may be correctable by employing a high-speed pulse shape detector, such as described in "Compensation of Self-Phase Modulation in Fiber-Based Chirped-Pulse Amplification Systems," by James van Howe et al., in Optics Letters. V. 31. No. 11, Jun. 1, 2006. However, electronically amplifying short pulse shapes accurately and with large enough voltage so that they can be applied to a phase modulator to effect correction for the nonlinear phase errors may be difficult or commercially impractical.

According to embodiments of the present disclosure, an amplitude modulator or modulators and a phase modulator or modulators generate a shaped optical pulse to be presented to an optical amplifier to generate an amplified shaped pulse. The amplitude modulator generates the shaped pulse when driven by a pulse signal. The shaped optical pulse is presented to a phase modulator configured to apply a phase correcting signal of the same temporal shape to pre-correct the optical pulse for the nonlinear phase error that is predicted to result from subsequent amplification of the shaped pulse. Application of the nonlinear phase correcting signal is timed so that it arrives simultaneously at the phase modulator with the optical pulse signal. Thus, application of the nonlinear phase correcting signal corrects the shaped pulse to remove the nonlinear phase error. Because the nonlinear phase of the fiber amplifier is proportional to the amplitude of the shaped optical pulse, and because the amplitude of the shaped optical pulse and the phase correcting signal used to pre-correct the phase of the shaped optical pulse are created by the same electrical pulses, the accumulated optical nonlinear phase error may be corrected without having to detect the shape of the shaped pulse.

Figure 1:
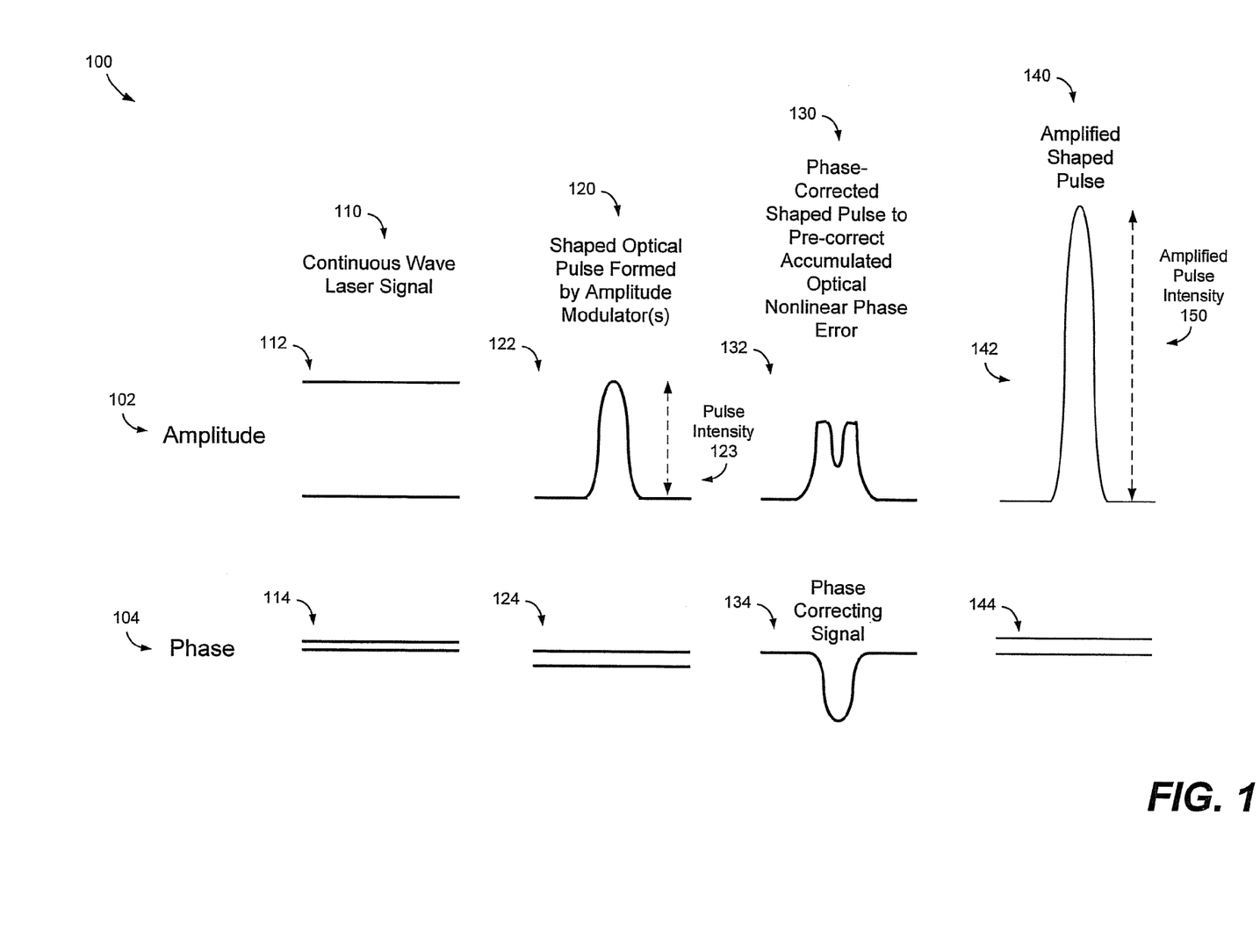
FIG. 1 is a plot of the amplitude and phase of a continuous wave laser signal from which a shaped pulse is formed and corrected for nonlinear phase error prior to being amplified.

FIG. 1 is a plot 100 of amplitude 102 and phase 104 of a continuous wave laser signal 110 from which a shaped optical pulse 120 is formed and phase-corrected to generate a pre-corrected shaped pulse 130. The pre-corrected shaped pulse 130 may be amplified, to generate a phase-corrected amplified shaped pulse 140 that is now phase corrected. The amplified shaped pulse 140 has an amplified pulse intensity 150. The amplified pulse intensity 150, compared to a pulse intensity 123 of the shaped pulse 122, provides a pulse intensity level whose nonlinear interaction with the fiber in the fiber amplifier substantially cancels the pre-correction phase and thereby produces a correctly phased pulse 144 as further described below. The continuous wave laser signal 110 has an amplitude 112 and a phase 114 from which, using an amplitude modulator (not shown in FIG. 1), the shaped optical pulse 120 having an amplitude 122 and a phase 124 is formed.

Because the peak intensity of the amplified shaped pulse 140 times the length of the fiber amplifier is larger than $\lambda/(2n_2)$, each shaped pulse, such as the shaped optical pulse 120, accumulates a nonlinear phase error. This accumulated optical nonlinear phase error is termed the Kerr Effect. For a train of short-duration pulses, the Kerr Effect may contribute a significant accumulated optical nonlinear phase error that can distort the shaped optical pulses. As a result, for example, in a coherent fiber amplifier array used to amplify and combine a plurality of shaped optical pulses, accumulated nonlinear optical phase error may prevent the coherent fiber amplifier array from coherently combining the plurality of shaped pulses.

To correct for the accumulated nonlinear phase error's distortion of the shaped pulses, high-speed pulse shape detectors may be used to determine the required phase correction for the nonlinear phase error as described by Howe et al. However, for short pulses, electronic amplifiers may not be able to apply a wide enough bandwidth to accurately replicate the pulse shape or a large enough voltage to correctly drive a pre-correction phase modulator. Therefore the applied pre-correction phase modulation may not successfully reduce the effects of the accumulated optical nonlinear phase error.

However, the accumulated optical nonlinear phase error is proportional to a pulse intensity of an amplified shaped optical pulse. Thus, because the shape of the shaped optical pulse is known prior to amplification, if the pulse intensity level that will result from amplification of the shaped optical pulse is known, a phase correcting signal 134 may be identified that can be applied to the shaped optical pulse 122 to generate a pre-corrected shaped pulse 130 to pre-correct for the subsequent, accumulated optical nonlinear phase error. Amplifying the pre-corrected shaped pulse 130 yields the amplified shaped pulse 140, free of nonlinear phase error that may distort the amplitude 142 or phase 144 of the amplified shaped pulse 140. In other words, because factors that can be used to correct for the accumulated optical nonlinear phase error, such factors including the shape of the shaped optical pulse and the pulse intensity level of the amplified pulse, are known, the shaped optical pulse can be pre-corrected to cancel out effects of accumulated optical nonlinear phase error, as further described below.

Figure 2:
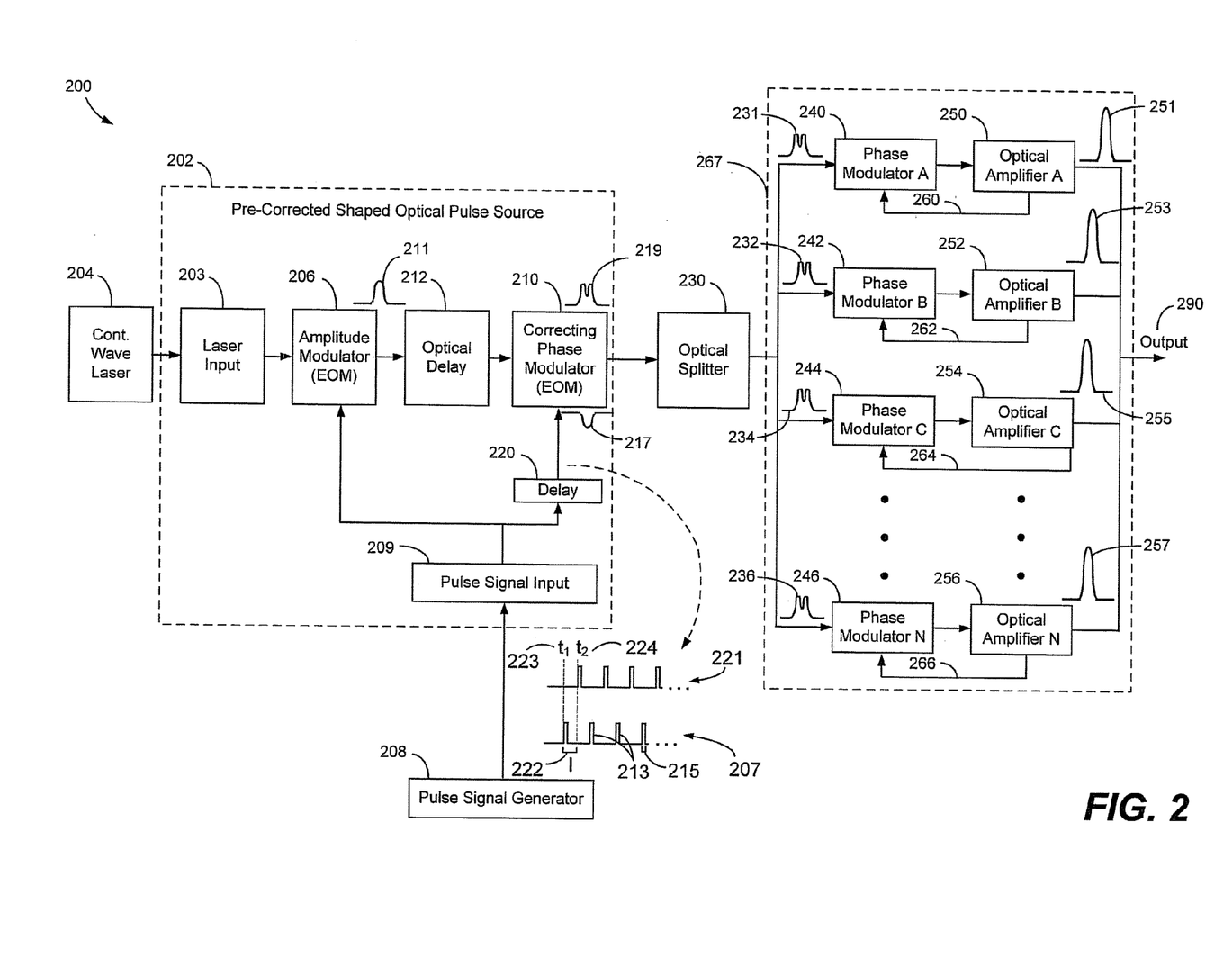
FIG. 2 is a block diagram of a system incorporating a first embodiment of a nonlinear phase-corrected pulse source.

FIG. 2 is a block diagram of a system, generally designated 200, incorporating a first embodiment of a pre-corrected shaped optical pulse source 202. The system 200 may include, for example, a coherent fiber amplifier array 267 used to amplify and combine a plurality of shaped optical pulses 231-236 generated by an optical splitter 230 in which a plurality of phase modulators 240-246 and a plurality of optical amplifiers 250, 252, 254, and 256, are used to generate a combined, amplified output 290. The coherent fiber amplifier array 267 may include feedback paths 260-266 to enable correction of linear phase errors in the plurality of shaped pulses generated by the splitter 230.

The nonlinear pre-corrected, shaped pulse optical source 202 includes a laser input 203 configured to receive an output of a continuous wave laser 204. The continuous wave laser 204 is of low enough power (on the order of 50 mW) that it does not create optical damage in the EOMs 206 and 210. The pre-corrected shaped pulse source 202 includes an amplitude modulator 206 that receives the continuous wave laser signal from the laser input 203. In an integrated embodiment, the continuous wave laser 204 is integrated with the pre-corrected shaped optical pulse source 202, so that the output of the continuous wave laser 204 is supplied directly to the amplitude modulator 206, thereby rendering the laser input 203 superfluous. The amplitude modulator 206 may include an electro-optical modulator (EOM) and an optical delay 212. The optical delay 212 is used to compensate for the fact that electrons travel slower than light the speed of light. Specifically, to enable synchronization of the phase correcting signal 217, as described further below, the optical delay 212 delays a shaped optical pulse 211 generated by the amplitude modulator 206 long enough to permit delaying the application of the phase correcting signal 217 to pre-correct for nonlinear phase error. According to one particular illustrative embodiment, because it is easier to adjust an electronic delay, the optical delay 212 may over-delay the shaped optical pulse 211 then the electronic delay 220 will be adjusted to compensate for any over-delay applied by the optical delay 212. Also, as further described below with reference to FIG. 6, the amplitude modulator 206 may include a plurality of modulation devices to form a desired shaped pulse from the continuous wave laser signal.

A pulse signal generator 208 generates a pulse signal 207 that may include a plurality of pulses 213. The pulses 213 may have a duration 215 of approximately one nanosecond (1 ns). The pulse signal 207 is presented to the pulse signal input 209 which, in turn, presents the pulse signal 207 to the amplitude modulator 206 and to an electronic delay 220. The pulse signal 207 drives the amplitude modulator 206 to form the shaped optical pulse 211. In an integrated embodiment, the amplitude modulator 206 receives the pulse signal 207 directly from the pulse signal generator 208, thereby rendering the pulse signal input 209 superfluous.

The shaped optical pulse 211 generated by the amplitude modulator 206 is transmitted through an optical delay line 212 and received by a correcting phase modulator 210. The correcting phase modulator 210 may include an electro-optical modulator (EOM). Also, as further described below with reference to FIG. 6, the correcting phase modulator 210 may include a plurality of modulation devices to effect the desired phase modulation. It should be noted that the correcting phase modulator 210 is a known phase modulator and is designated specifically as a correcting phase modulator 210 to describe its function and to distinguish the correcting phase modulator 210 from the phase modulators 240-246 that are used in a coherent fiber amplifier array 206 to amplify the shaped optical pulses produced by the pre-corrected shaped optical pulse source 202.

The correcting phase modulator 210 generates a phase correcting signal responsive to the pulse intensity level, as previously described with reference to FIG. 1. As previously described, an accumulated optical nonlinear phase error for a shaped pulse is proportional to the pulse intensity level of an amplified pulse. Thus, knowing the shape of the shaped optical pulse 211 generated by the amplitude modulator 206 and the pulse intensity level resulting from the amplification of the shaped optical pulse, a correcting phase modulator can generate a phase correcting signal 217 to offset and thereby pre-correct the accumulated optical nonlinear phase error that results from amplification of the shaped optical pulse 211 by the optical amplifiers 250-256. As described with reference to FIG. 1, the phase correcting signal 217 is an inverted phase signal, like the phase correcting signal 134. Combining the phase correcting signal 217 with the shaped pulse 211 yields a pre-corrected shaped pulse 219. The pre-corrected shaped pulse 219 is pre-corrected for accumulated optical nonlinear phase error so that when the pre-corrected shaped pulse 219 is amplified, after being split into a plurality of pre-corrected shaped pulses 231-236 by the optical splitter 230, a resulting plurality of amplified shaped pulses 251, 253, 255, and 257 are free from, or have substantially reduced, accumulated optical nonlinear phase error.

The correcting phase modulator 210 applies the phase correcting signal 217 to the shaped optical pulse 211 when driven by a delayed pulse signal 221. The delayed pulse signal 221 represents the pulse signal 207 as shifted by an interval I 222 between a first time $t_1$ 223 when the amplitude modulator 206 receives the pulse signal and a second time $t_2$ 224 when the shaped optical pulse 211 is received by the correcting pulse modulator 210. Thus, the interval I 222 compensates for or allows for a time that the shaped optical pulse 211 propagates through the amplitude modulator 206 to the correcting phase modulator 210. The delayed pulse signal 221 is generated by the electronic delay 220.

According to an embodiment of the present disclosure, the electronic delay 220 may be a conductor, configured to convey the pulse signal 207 generated by the pulse signal input 209 to the correcting phase modulator 210, where the conductor has a conductor length such that a propagation time of the pulse signal 207 through the conductor is approximately equal to the interval I 222. Alternatively, the electronic delay 220 may include another analog or digital device configured to delay the pulse signal 207 by the interval I 222. By providing the delayed pulse signal 221, the correcting pulse modulator 210 is synchronized to apply the phase correcting signal 217 to the shaped optical pulse 211 at the appropriate instant, eliminating a need for a pulse shape detector to attempt to synchronize the application of a phase correcting signal 217.

The correcting phase modulator 210 also receives a pulse intensity level that will result, for example, from the optical amplifiers' 250, 252, 254, and 256 amplification of the shaped optical pulse. As previously described, when the shape of the shaped optical pulse 211 and the pulse intensity are known, the accumulated optical nonlinear phase error can be predetermined and pre-corrected before the shaped optical pulse is amplified. According to an embodiment of the present disclosure, when the intensity of the shaped optical pulse 211 and the resulting intensity of the amplified shaped pulse are known, the correcting phase modulator 210 can be programmed with the pulse intensity information to be used in generating the phase correcting signal. Alternatively, as further described below, the intensity of the amplified shaped pulse may be provided to the correcting phase modulator 210 with a feedback path from a corresponding amplifier used to generate the amplified shaped pulse.

In the system 200, the pre-corrected shaped pulse 219 generated by the correcting phase modulator 210 is provided to the optical splitter 230 to generate the plurality of pre-corrected shaped pulses 231-236. The plurality of pre-corrected shaped pulses 231-236 are then amplified by the plurality of optical amplifiers 250, 252, 254, and 256 to generate the plurality of amplified shaped pulses 251, 253, 255, and 257. Each of the plurality of amplified shaped pulses 251, 253, 255, and 257, having been split from the pre-corrected shaped pulse 219 generated by the correcting phase modulator 210, is free from or has substantially reduced accumulated optical nonlinear phase error. The plurality of amplified shaped pulses 251, 253, 255, and 257 are combined by the coherent fiber amplifier array 206 using a beam combiner (not shown in FIG. 2) to generate the output 290.

Figure 3:
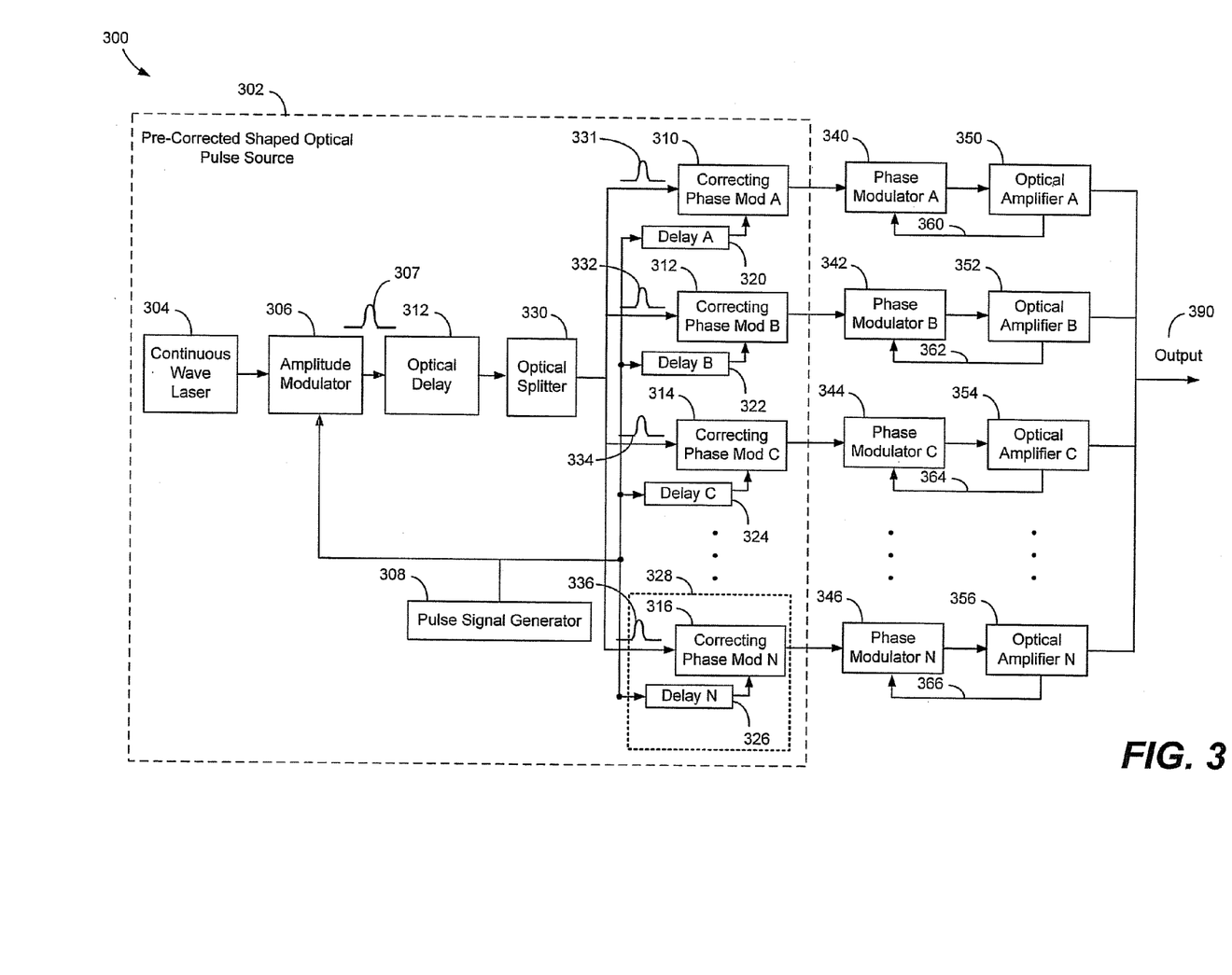
FIG. 3 is a block diagram of a system incorporating a second embodiment of a nonlinear phase-corrected pulse source.

FIG. 3 is a block diagram of a system, generally designated 300, incorporating a second embodiment of a pre-corrected shaped optical pulse source 302. The pre-corrected shaped optical pulse source 302 is very similar to the pre-corrected shaped optical pulse source 202 of FIG. 2, with four notable distinctions. First, the pre-corrected shaped optical pulse source 302 includes an integrated continuous wave laser 304, thereby rendering superfluous a separate laser input, such as the laser input 203 of FIG. 1. Second, the pre-corrected shaped optical pulse source 302 includes an integrated pulse signal generator 308, thereby rendering superfluous a separate pulse signal input, such as the pulse signal input 209 of FIG. 1. Third, the pre-corrected shaped optical pulse source 302 includes an optical splitter 330 that receives a single shaped pulse 307, produced by an amplitude modulator 306 and an optical delay 312, and generates a plurality of shaped optical pulses 331-336. Fourth, the pre-corrected shaped optical pulse source 302 includes a plurality of correcting phase modulators 310-316 and delay devices 320-326. Each of the correcting phase modulators 310-316 and the associated delay devices 320-326 can be considered as a separate correcting phase modulation system, such as a correcting phase modulation system 328 that includes correcting phase modulator N 316 and delay device N 326. Each of the plurality of shaped optical pulses 331-336 generated by the optical splitter 330 is individually corrected by one of the plurality of correcting phase modulators 310-316. Each of the resulting plurality of pre-corrected pulses is then provided to one of the plurality of phase modulators 340-346. The plurality of pre-corrected pulses is then amplified and phase corrected by the phase modulators 340-346, the optical amplifiers 350-356, and feedback paths 360-366, resulting in a combined output 390.

Each of the plurality of correcting phase modulation systems, including one of the correcting phase modulators 310-316 and one of the delay devices 320-326, such as the correcting phase modulation system 328, receives one of the plurality of shaped optical pulses generated by the optical splitter 330. Each of the correcting phase modulators 310-316 applies a phase correcting signal to one of the received shaped optical pulses 331-336 it receives when driven by a delayed pulse signal received from one of the respective delay devices 320-326. The delay devices 320-326 may be individually adjusted to appropriately delay generation of the delayed pulse signal to account for variances in a position of each of the correcting phase modulators 310-316 from the amplitude modulator 306 and to account for any further propagation delay caused by the optical splitter 330.

Figure 4:
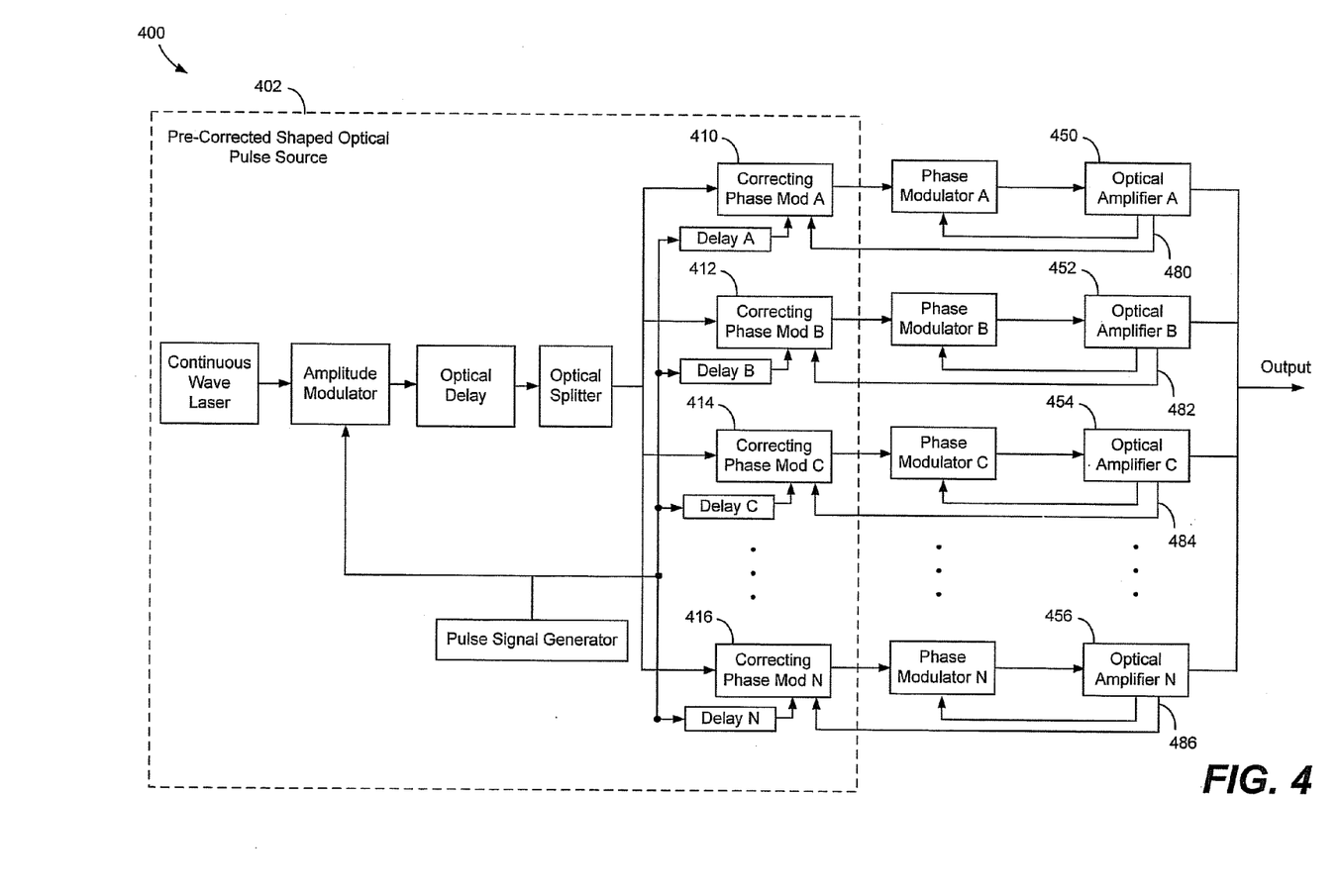
FIG. 4 is a block diagram of a system incorporating a third embodiment of a nonlinear phase-corrected pulse source.

FIG. 4 is a block diagram of a system, generally designated 400, incorporating another embodiment of a pre-corrected shaped optical pulse source 402. The pre-corrected shaped optical pulse source 402 is very similar to the pre-corrected shaped optical pulse source 302 of FIG. 3 except for the inclusion of feedback paths 480-486 between the optical amplifiers 450-456 and the correcting phase modulators 410-416. Inclusion of the feedback paths 480-486 may be used to provide the pulse intensity level resulting from the amplification by each of the optical amplifiers 450-456 to each of the respective correcting phase modulators 410-416. The pulse intensity level resulting from the amplification of the shaped optical pulses by the optical amplifiers 450-456 may be a fixed intensity level. Thus, the correcting phase modulators 410-416 may be configured to generate the phase correcting signal based on the fixed intensity level. Alternatively, as shown in FIG. 4, each of the correcting phase modulators 410-416 may be supplied with the pulse intensity level or pulse intensity levels of the amplified shaped optical pulses by the feedback paths 480-486.

Whether the pulse intensity level resulting from the amplification of the pre-corrected shaped pulse by the optical amplifiers 450-456 is a fixed intensity level or a variable intensity level, the pulse intensity level is provided by the feedback paths 480-486 to the correcting phase modulators 410-416. Based on the known shape of the plurality of shaped pulses 431-436 formed from a shaped optical pulse 307 and based on the pulse intensity level provided by the feedback paths 480-486, the correcting phase modulators 410-416 generate phase correcting signals (not shown in FIG. 4) to offset accumulated optical nonlinear phase error as previously described. However, in contrast to the system 300 of FIG. 3, because the system of FIG. 4 includes the feedback paths 480-486, if there is any variance over time or over the predicted pulse intensity levels, the pre-corrected shaped optical pulse source 402 can respond to the changes in pulse intensity level. The nonlinear phase modulators 410-416 may adapt the phase correcting signals they generate to correct for changes in the resulting accumulated optical nonlinear phase error caused by variations in the pulse intensity levels.

Figure 5:
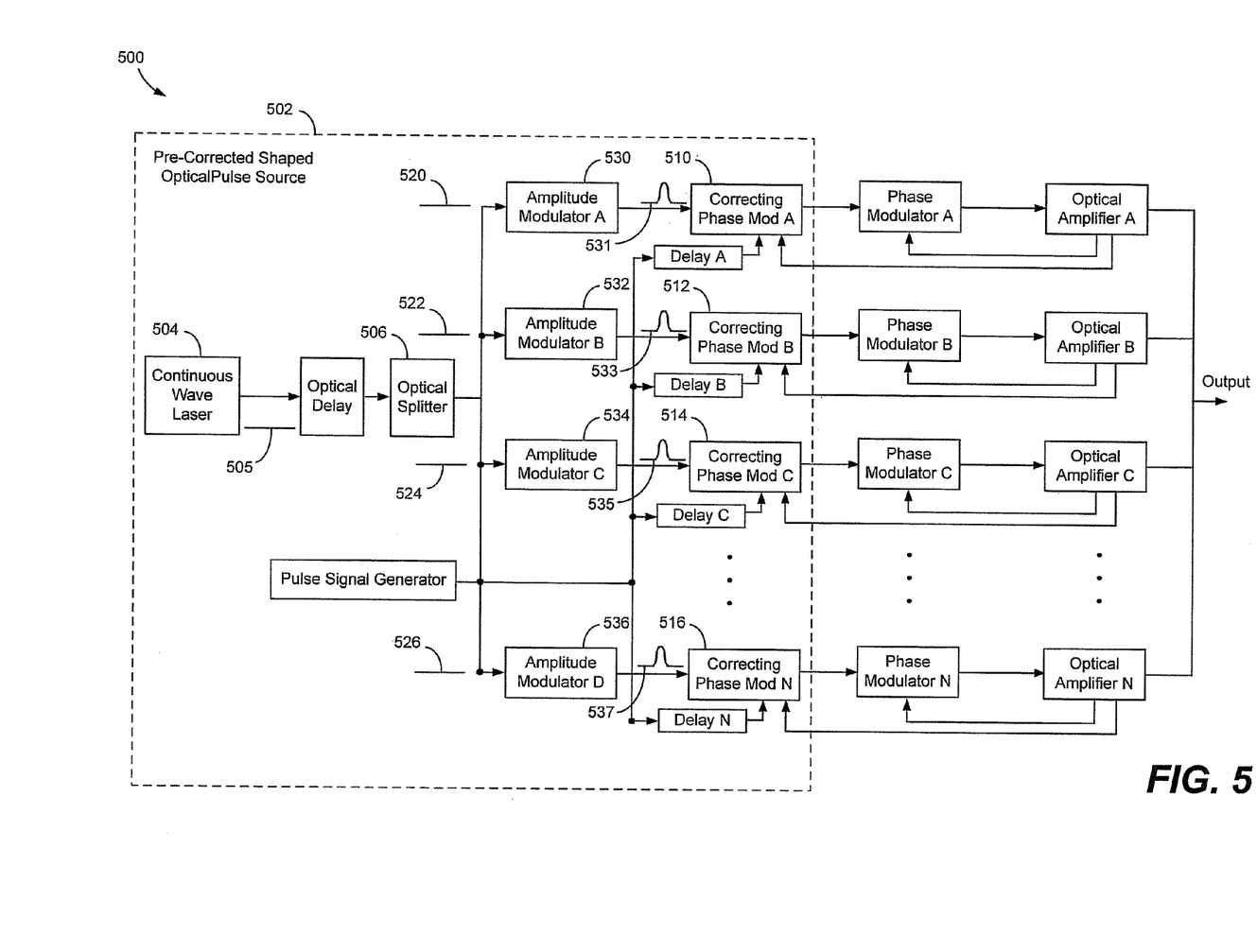
FIG. 5 is a block diagram of a system incorporating a fourth embodiment of a nonlinear phase-corrected pulse source.

FIG. 5 is a block diagram of a system, generally designated 500, incorporating another embodiment of a pre-corrected shaped optical pulse source 502. The pre-corrected shaped optical pulse source 502 is very similar to the pre-corrected shaped optical pulse source 402 of FIG. 4 except that an optical splitter 506 is positioned between the continuous wave laser 504 and a plurality of amplitude modulators 530-536. The optical splitter 506 is configured to receive a continuous wave laser signal 505 generated by the continuous wave laser 504 and to generate a plurality of split continuous wave laser signals 520-526. Each of the plurality of split continuous wave laser signals 520-526 is received by one of a plurality of amplitude modulators 530, 532, 534, and 536 that generate a plurality of shaped optical pulses 531, 533, 535, and 537. Thus, instead of using a single amplitude modulator, such as the amplitude modulator 306 of FIG. 3, and providing the shaped optical pulse 311 to an optical splitter, such as the optical splitter 330, each of the plurality of shaped optical pulses 531, 533, 535, and 537 is individually generated by one of the plurality of amplitude modulators 430, 532, 534, and 536 and supplied to one of a plurality of correcting phase modulators 510-516. Each of the plurality of correcting phase modulators 510-516 applies a phase-correcting signal (not shown in FIG. 5) to pre-correct for accumulated optical nonlinear phase error in one of the plurality of shaped optical pulses 531, 533, 535, and 537.

Figure 6:
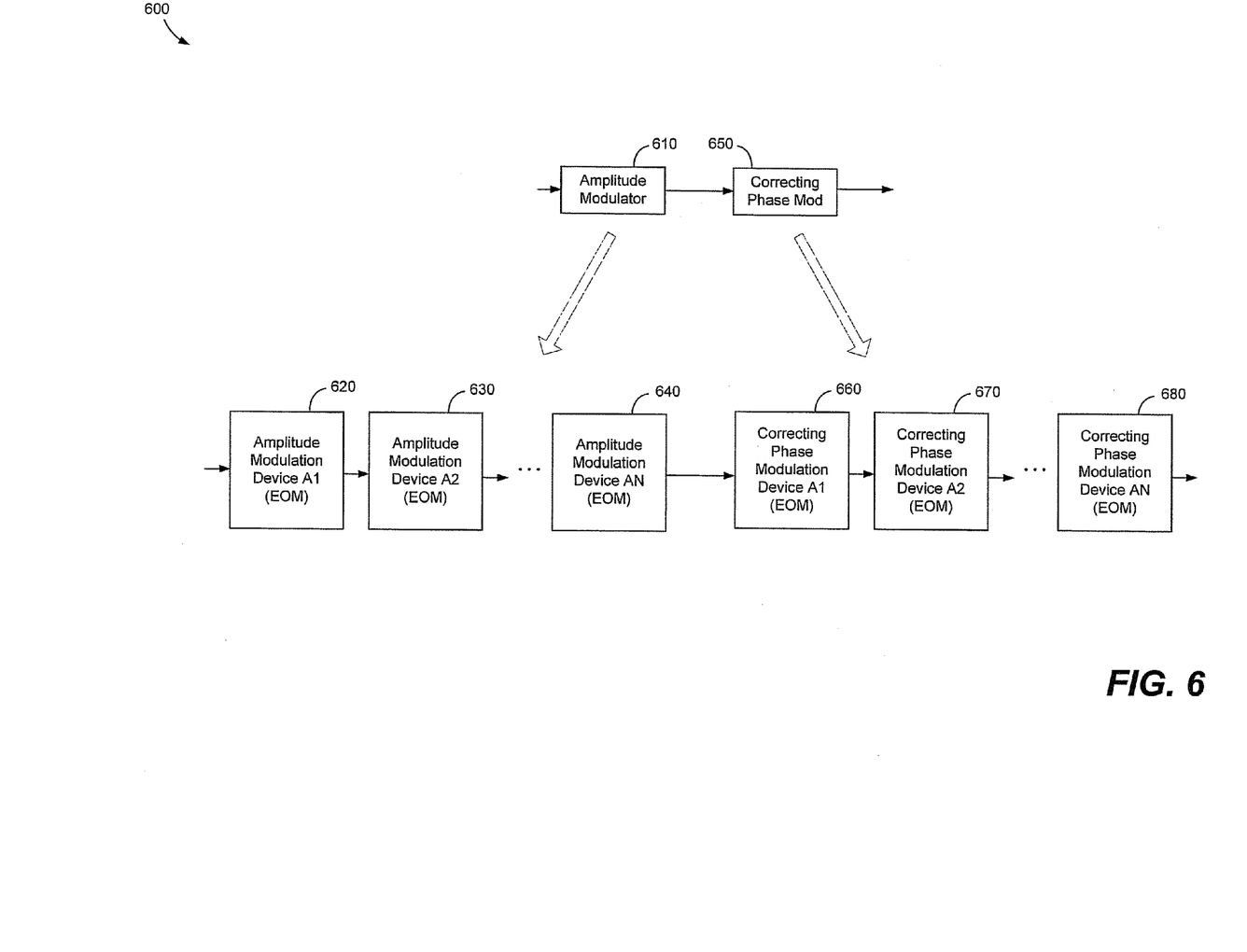
FIG. 6 is a block diagram of an amplitude modulator and a phase modulator in which each is comprised of a plurality of modulation devices.

FIG. 6 is a block diagram of an amplitude modulator 610 and a phase modulator 650, each of which is comprised of a plurality of modulation devices. In order to generate a shaped optical pulse having a desired shape or to pre-correct for accumulated optical nonlinear phase error of a shaped optical pulse, multiple electro-optical modulators (EOMs) or other modulators may be arranged in series. If a single modulation device is not capable of forming a shaped optical pulse in a desired shape, e.g., if a single modulation device is unable to form a shaped optical pulse having a sufficiently sharp ratio between a minimum value and a maximum value, a series of modulation devices can be used to sequentially shape the optical pulse to generate a shaped optical pulse with the desired shape. Thus, for example, the amplitude modulator 610 may be comprised of a plurality of modulation devices 620-640. The first amplitude modulation device 620 may receive a continuous wave laser signal to begin forming a shaped optical pulse from the continuous wave laser signal, while each of the successive amplitude modulation devices 630 and 640 receive an output of a preceding modulation device as its input and continue the shaping process. Similarly, the correcting phase modulator 650 may be comprised of a plurality of modulation devices 660-690. The first phase modulation device 660 may receive a shaped optical pulse to begin applying a phase correcting signal to pre-correct the shaped optical pulse for accumulated optical nonlinear phase error, while each of the successive phase modulation devices 670 and 680 receive an output of a preceding modulation device as its input. Each successive phase modulation device then continues the pre-correcting process.

Figure 7:
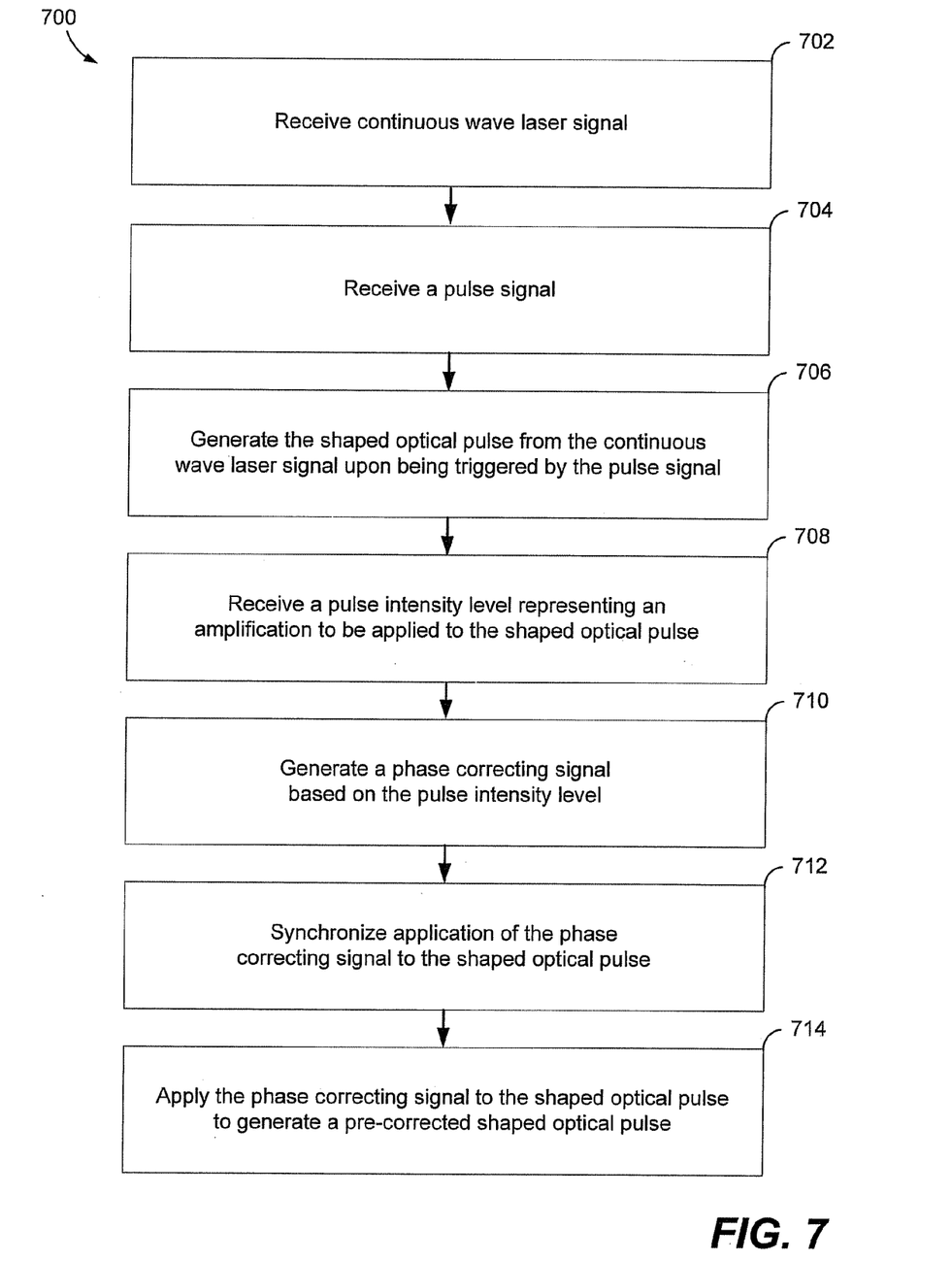
FIG. 7 is a flow chart of an embodiment of a method for correcting nonlinear phase error in a shaped pulse to be submitted to an amplifier.

FIG. 7 is a flow chart 700 of an embodiment of a method for pre-correcting for accumulated optical nonlinear phase error. A continuous wave laser signal is received, at 702. A pulse signal is received, at 704. A shaped optical pulse is generated from the continuous wave laser signal upon being driven by the pulse signal, at 706. A pulse intensity level representing an amplification to be applied to the shaped optical pulse is received, at 708. A phase correcting signal is generated based on the pulse intensity level, at 710.

Application of the phase correcting signal to the shaped optical pulse is synchronized, at 712. According to an embodiment, the application of the phase correcting signal is synchronized to allow for a time during which the shaped pulse is generated and presented for application of the phase correcting signal. The application of the phase correcting signal is delayed so that it is applied to the shaped pulse to pre-correct the shaped pulse for accumulated optical nonlinear phak error that may result if a non-pre-corrected shaped pulse optical is amplified. The shape of the shaped optical pulse is known and the accumulated optical nonlinear phase error may be readily determined because the accumulated optical nonlinear phase error will be proportional to the pulse intensity that will result from amplification of the shaped optical pulse. Thus, delaying the pulse signal to synchronize the application of the phase correcting signal to the shaped pulse optical enables correction of the accumulated optical nonlinear phase error in the amplified shaped optical pulse without using a shape detector or otherwise analyzing the shape of the amplified shaped optical pulse to identify the accumulated optical nonlinear phase error. The phase correcting signal is applied to the shaped optical pulse to generate the pre-corrected shaped pulse, at 714.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system, comprising:
   a laser input configured to receive a continuous wave laser signal;
   a pulse signal input configured to receive a pulse signal;
   an amplitude modulator configured to receive the continuous wave laser signal and the pulse signal and to generate a shaped optical pulse when driven by the pulse signal;
   a correcting phase modulator configured to receive the shaped optical pulse, a delayed pulse signal, and a pulse intensity level, wherein the correcting phase modulator generates a phase correcting signal responsive to the pulse intensity level and applies the phase correcting signal to the shaped optical pulse when driven by the delayed pulse signal to generate a pre-corrected shaped optical pulse; and
   a delay device configured to receive the pulse signal at a same time that the amplitude modulator receives the pulse signal and to generate the delayed pulse signal.

2. The system of claim 1, further comprising a continuous wave laser configured to generate a high-power continuous wave laser signal applied to the laser input, wherein the high-power continuous wave laser signal produces a continuous wave laser signal output providing at least 100 watts in power.

3. The system of claim 1, further comprising a pulse generator configured to provide the pulse signal to the pulse signal input.

4. The system of claim 3, wherein the pulse generator is configured to generate a plurality of pulse signals, wherein each of the plurality of pulse signals has a pulse duration of approximately one nanosecond.

5. The system of claim 1, wherein the amplitude modulator comprises a plurality of amplitude modulation devices, wherein each of the plurality of amplitude modulation devices is configured to participate in generating the shaped optical pulse, wherein:
   a first amplitude modulation device receives the continuous wave laser signal; and
   each successive amplitude modulation device receives an output of a preceding amplitude modulation device.

6. The system of claim 1, wherein the correcting phase modulator includes a plurality of correcting phase modulation devices, wherein:
   a first correcting phase modulation device receives the shaped optical pulse; and
   each successive correcting phase modulation device receives an output of a preceding correcting phase modulation device.

7. The system of claim 1, wherein one or more of the amplitude modulator and the correcting phase modulator includes an electro-optical modulator.

8. The system of claim 1, wherein the pulse intensity level is proportional to a phase resulting from amplification of the pre-corrected shaped optical pulse by an optical amplifier.

9. The system of claim 8, wherein the pulse intensity level comprises:
   a fixed intensity level corresponding to a fixed amplification level to be applied to the pre-corrected shaped optical pulse by the optical amplifier; or
   a variable intensity level provided to the correcting phase modulator by a feedback path from the optical amplifier.

10. The system of claim 1, wherein the delayed pulse signal represents the pulse signal shifted by an interval between a first time when the amplitude modulator receives the pulse signal and a second time when the shaped optical pulse is received by the correcting phase modulator.

11. The system of claim 10, wherein the delay device comprises a conductor configured to convey the pulse signal from a pulse signal generator to a nonlinear phase modulator, wherein the conductor has a conductor length such that a propagation time of the pulse signal through the conductor is approximately equal to the interval.

12. A system, comprising:
   a continuous wave laser configured to generate a continuous wave laser signal;
   a pulse generator configured to generate a pulse signal including a plurality of pulses, each of the plurality of pulses having a duration of approximately one nanosecond;
   an amplitude modulation system configured to receive the continuous wave laser signal and the pulse signal and to generate a plurality of shaped optical pulses; and
   a plurality of correcting phase modulation systems, wherein each of the plurality of correcting phase modulation systems includes a correcting phase modulator configured to receive one of the plurality of shaped optical pulses, a delayed pulse signal, and a pulse intensity level, wherein the correcting phase modulator generates a phase correcting signal responsive to the pulse intensity level and applies the phase correcting signal to one of the plurality of shaped optical pulses when driven by the delayed pulse signal.

13. The system of claim 12, wherein each of the plurality of correcting phase modulation systems further comprises a delay device configured to receive the pulse signal at a same time that the amplitude modulation system receives the pulse signal and to generate the delayed pulse signal.

14. The system of claim 13, wherein the delayed pulse signal represents the pulse signal shifted by an interval between a first time when the amplitude modulation system receives the pulse signal and a second time when the shaped pulse is received by the correcting phase modulator.

15. The system of claim 14, wherein the delay device comprises a conductor configured to convey the pulse signal from the pulse generator to the correcting phase modulator, wherein the conductor has a conductor length such that a propagation time of the pulse signal through the conductor is approximately equal to the interval.

16. The system of claim 12, wherein the amplitude modulation system comprises:

an optical signal splitter configured to receive the continuous wave laser signal and to generate a plurality of split laser signals, and a plurality of amplitude modulators, wherein each of the plurality of amplitude modulators is configured to receive one of the plurality of split laser signals and to generate one of the plurality of shaped optical pulses; or a single amplitude modulator configured to receive the continuous wave laser signal and to generate a shaped optical pulse, and an optical splitter configured to receive the shaped optical pulse and to split the shaped pulse into the plurality of shaped optical pulses.

17. The system of claim 12, wherein the pulse intensity level is proportional to a phase resulting from subsequent amplification to be applied to a pre-corrected shaped pulse by an optical amplifier configured to receive the pre-corrected shaped pulse and comprises:

a fixed intensity level resulting from a fixed amplification applied by the optical amplifier; or a variable intensity level resulting from a variable amplification applied by the optical amplifier, wherein the variable intensity level is provided by a feedback path from the optical amplifier to the correcting phase modulator.

18. A method, comprising:

receiving a continuous wave laser signal;

receiving a pulse signal;

generating a shaped optical pulse from the continuous wave laser signal upon being driven by the pulse signal;

receiving a pulse intensity level representing amplification phase resulting from subsequent amplification of the shaped optical pulse;

generating a phase correcting signal based on the pulse intensity level, wherein the phase correcting signal is configured to pre-correct the shaped optical pulse to correct for accumulated optical nonlinear phase error resulting from the subsequent amplification of the shaped optical pulse;

synchronizing application of the phase correcting signal to the shaped optical pulse; and applying the phase correcting signal to the shaped pulse to generate a pre-corrected shaped optical pulse.

19. The method of claim 18, wherein synchronizing the application of the phase correcting signal to the shaped optical pulse further comprises allowing for an interval during which the shaped optical pulse is generated and presented for application of the phase correcting signal.

20. The method of claim 18, wherein synchronizing the application of the phase correcting signal includes delaying application of the pulse signal to generate a delayed pulse signal configured to apply the phase correcting signal to the shaped optical pulse.

* * * * *